J. U. BARR.
GOGGLES.
APPLICATION FILED MAY 15, 1912.
1,095,543.
Patented May 5, 1914.
2 SHEETS—SHEET 2.
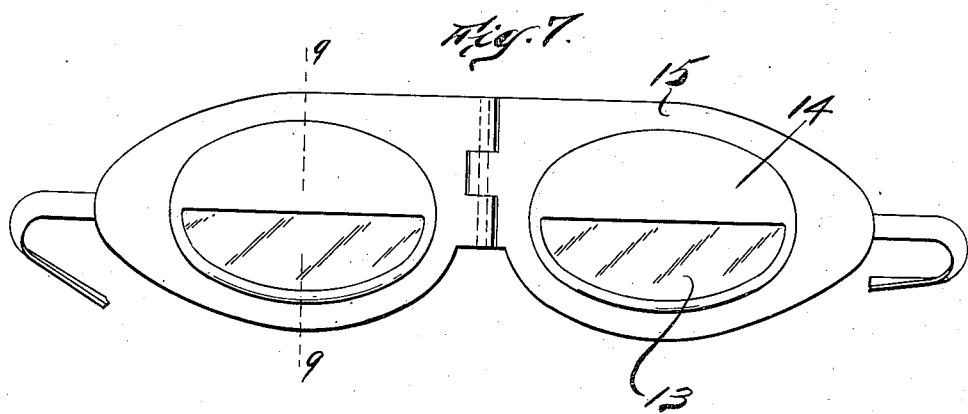
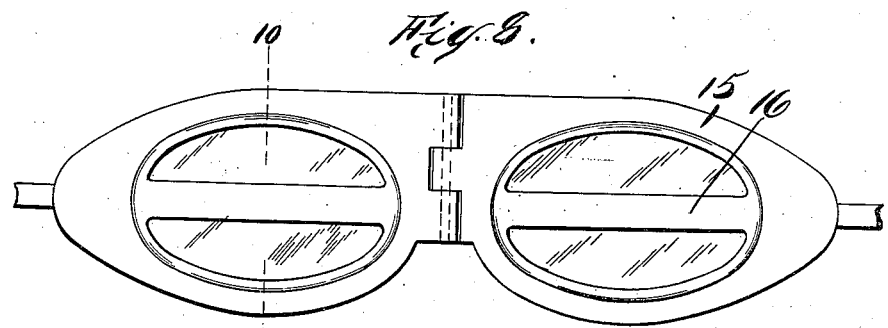
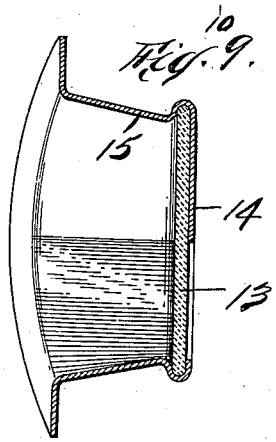
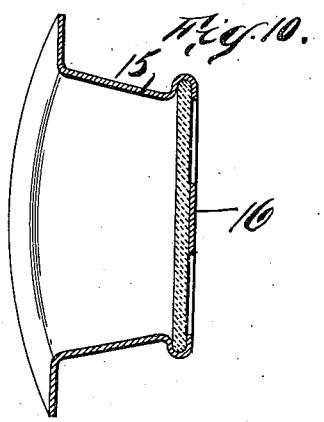

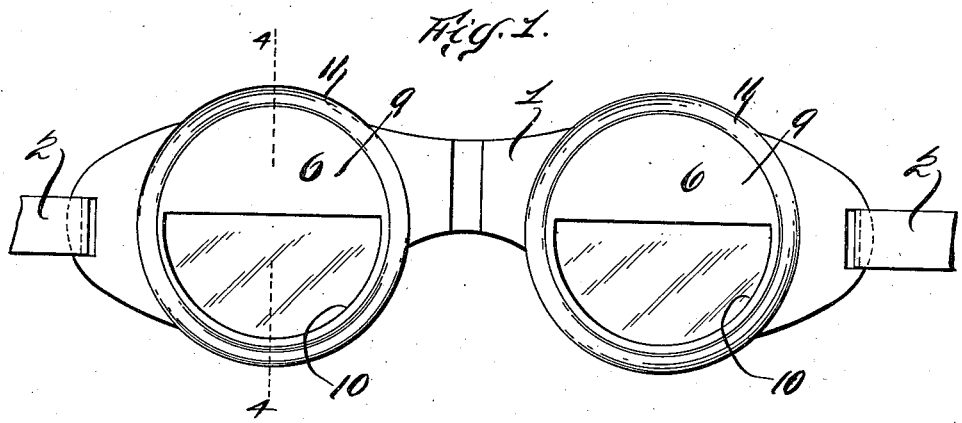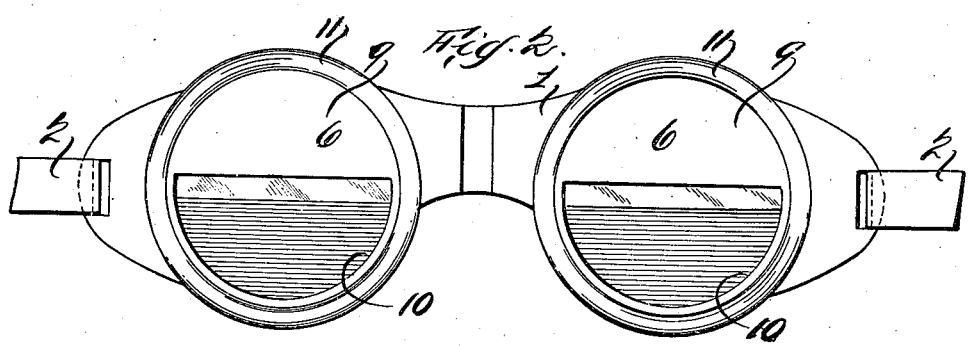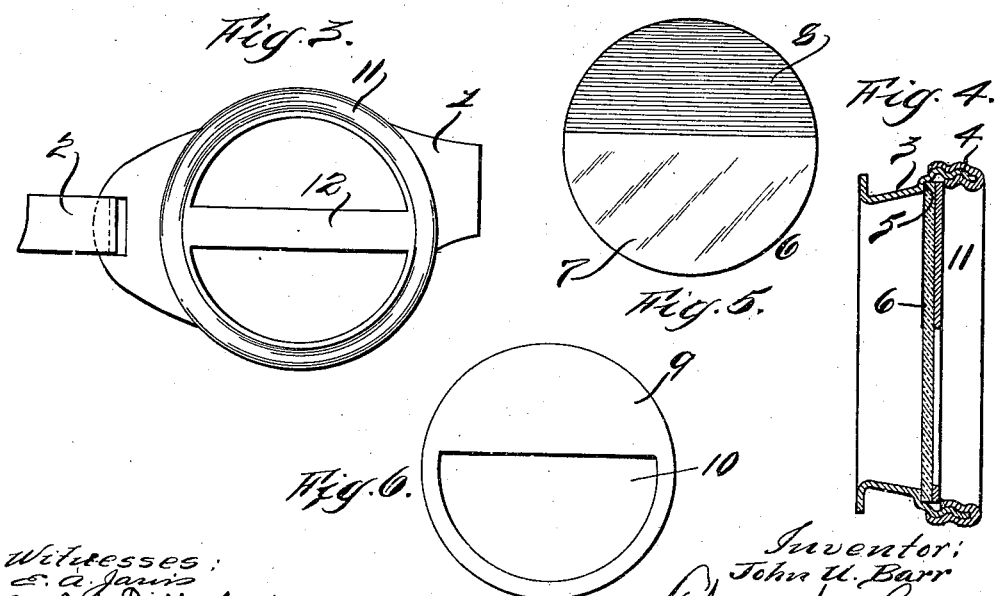

UNITED STATES PATENT OFFICE.

JOHN U. BARR, OF NEW YORK, N. Y.

GOGGLES.

1,095,543.  Specification of Letters Patent.  Patented May 5, 1914.

Application filed May 15, 1912. Serial No. 697,377.

*To all whom it may concern:*

Be it known that I, JOHN U. BARR, a citizen of the United States, residing at New York city, in the county and State of New York, have invented certain new and useful Improvements in Goggles, of which the following is a clear, full, and exact description.

The object of this invention is to provide improved goggles for the use of those exposed to the direct sun's rays, or reflected sun's rays, so that the eye may be shielded properly without cutting off the vision.

A further object is to provide a pair of goggles which may be shielded as above set forth, and in which the shield may be adjustable into various positions depending upon whether the rays are direct or reflected.

The scope of my invention will be pointed out in the claims.

As shown in the accompanying drawings: Figure 1 is a front view of a pair of goggles provided with my improved invention. Fig. 2 is a view of the same showing the shield, and a glass of a clouded and clear zone. Fig. 3 is a face view of one-half of a pair of goggles showing a modified form of eye protection. Fig. 4 is a section on line 4—4 Fig. 1. Fig. 5 is a detail of the clear and dark glass used by me. Fig. 6 is a detail of the opaque shield. Fig. 7 is a front view of a modified form of goggle with protecting shield. Fig. 8 is a similar view to Fig. 7, but showing opaque shield of different shade. Fig. 9 is a section on line 9—9 Fig. 7. Fig. 10 is a section on line 10—10 Fig. 8.

As shown in the accompanying drawings, the goggles are provided with the usual nose bridge 1, and straps 2, and with circular sleeves 3 as shown in Figs. 1 to 6 provided with a threaded outer rim 4. In the sleeve 3 a seat 5 is provided for the glass 6, which is preferably of a clear or transparent section or zone 7, and a darkened section or zone 8. In front of the glass there is provided an opaque, preferably metallic shield, which may be of the shape shown in Fig. 6, to wit: circular, and of the same size as the glass of Fig. 5, and provided with an upper portion 9 of the metal, and a cut-out lower semicircle 10. A threaded rim part 11 is then secured in place over the threaded edge of the sleeve 3 to hold the glass and the shield in any desired adjusted position.

As shown in Figs. 1 to 6, in the first instance in Fig. 1, I have shown the glass with the darkened portion hidden behind the shield so that the wearer's eyes will be well protected, but the vision below the center of the shield will be absolutely clear while in Fig. 2 I have shown the glass in such position that a slit of clear glass appears between the shield and the darkened portion, while the darkened portion covers the greater area of the opening in the shield. In Fig. 3, in place of the shield of Fig. 6 I have shown a shield having a circular outside edge, and a band 12 across its center. Any one of the shields shown may be adjusted into any position desired, depending upon whether the light comes from above, below, from the right or from the left hand. In the shield, Fig. 3, the wearer will by custom learn to shield his eye behind the bar 12, and peer out above and below the same.

In Figs. 7 to 10 I have shown goggles provided with the opaque shield portions, but not with readily removable or adjustable glasses and shields. In Fig. 7, 13 is the glass and 14 is the shield securely mounted to the protecting material 15 of the goggles, while in Fig. 8 I have shown a similar pair of goggles with a cross bar 16 of opaque material for shielding the eye.

It will be understood that the opaque shield which is adjusted or fixed in front of a portion of the lens or glass is mounted close to the glass, so that there shall be no space for the passage of light rays between the glass and the shield, and I particularly disclaim any structure where an opaque shield is mounted on a bracket held at a distance in front of the glass, which shield generally carries a mirror on its inner face, so that the eye behind the glass will be able to see reflected in the mirror devices in back of the goggles.

I claim as my invention:

1. The herein described goggles, consisting of members protecting each eye, a glass for said members, an opaque shield occupying a portion of the space in front of the eye, there being no space for the passage of light rays between the glass and the shield.

2. The herein described goggles consisting of members protecting each eye, a glass for said members, an opaque shield occupying a portion of the space in front of the eye and lying in close proximity to the glass of the goggle, said opaque shield being secured so as to be moved in a plane parallel with the glass into various adjustable positions and means for securing the glass in such positions.

3. A pair of goggles comprising sleeve-like portions surrounding the eyes when in use, a threaded rim for said sleeve-like portions, a glass fitting each of said portions, a shield partly covering said glass, and a threaded retaining ring holding said parts in place.

4. A pair of goggles comprising sleeve-like portions surrounding the eyes when in use, a threaded rim for said sleeve-like portions, a glass fitting each of said portions, a shield partly covering said glass, and a threaded retaining ring holding said parts in place, said glass having a clear portion and a darkened portion.

Signed at New York city, New York, this 9th day of May, one thousand nine hundred and twelve.

JOHN U. BARR.

Witnesses:
  FRED F. WEISS,
  MABEL DITTENHOEFER.